Figure 1:
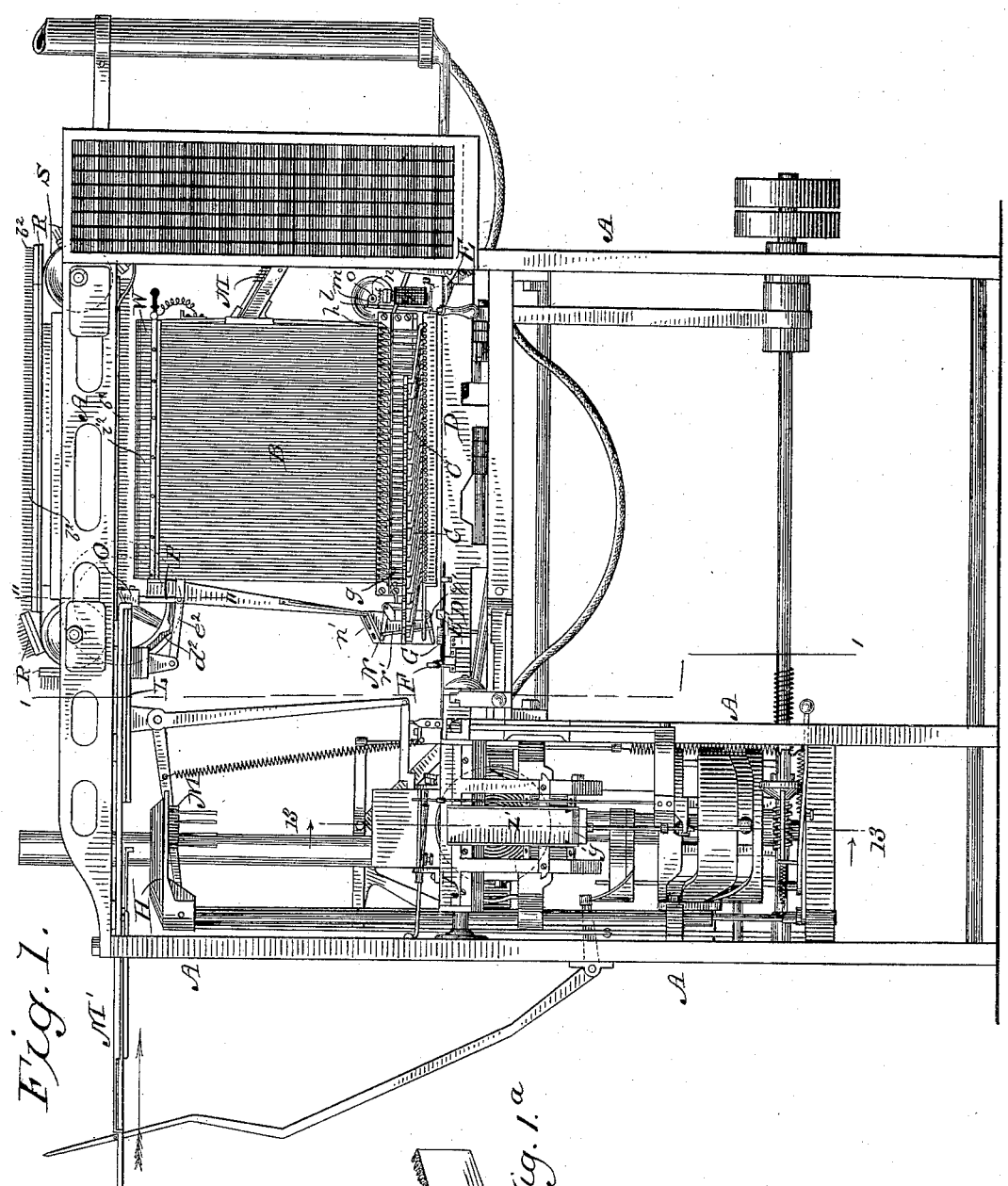

(No Model.) 16 Sheets—Sheet 1.

O. MERGENTHALER.
MACHINE FOR FORMING TYPE BARS.

No. 378,797. Patented Feb. 28, 1888.

Witnesses:
Al. C. Newman.
Ed. A. Newman.

Inventor
OTTMAR MERGENTHALER,
By his Attorney
Philip T. Dodge (No Model.) 16 Sheets—Sheet 2.

O. MERGENTHALER.
MACHINE FOR FORMING TYPE BARS.

No. 378,797. Patented Feb. 28, 1888.

Witnesses. Inventor
Al. C. Thurman. OTTMAR MERGENTHALER
Ed. A. Newman. By his Attorney P.T. Dodge (No Model.) 16 Sheets—Sheet 3.

O. MERGENTHALER.
MACHINE FOR FORMING TYPE BARS.

No. 378,797. Patented Feb. 28, 1888.

Witnesses:
Al. C. Newman
Ed. A. Newman

Inventor:
OTTMAR MERGENTHALER,
By his Attorney
Philip T. Dodge (No Model.) 16 Sheets—Sheet 4.
O. MERGENTHALER.
MACHINE FOR FORMING TYPE BARS.
No. 378,797. Patented Feb. 28, 1888.
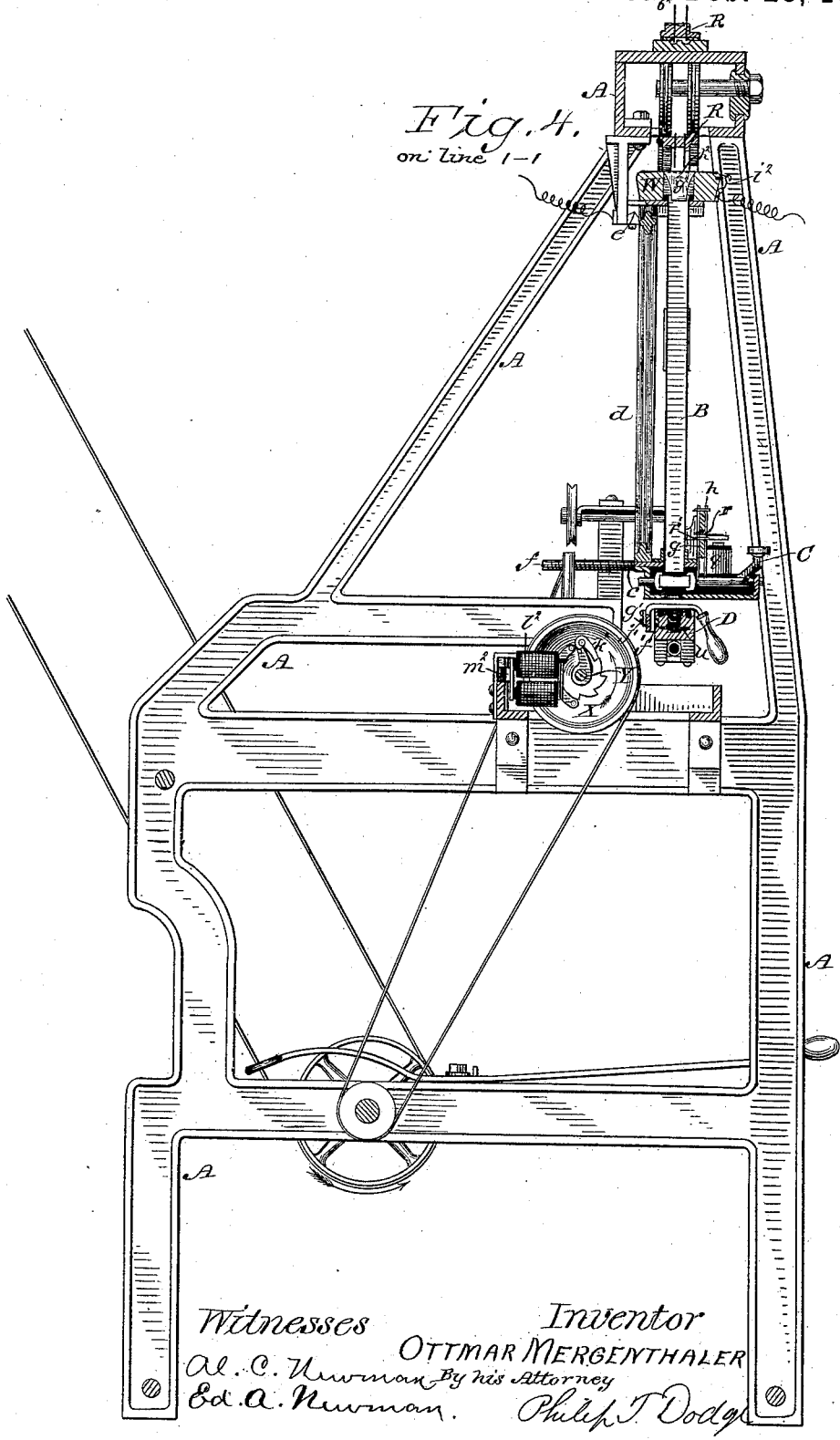
Witnesses
Al. C. Newman
Ed. A. Newman.
Inventor
OTTMAR MERGENTHALER
By his Attorney
Philip T. Dodge

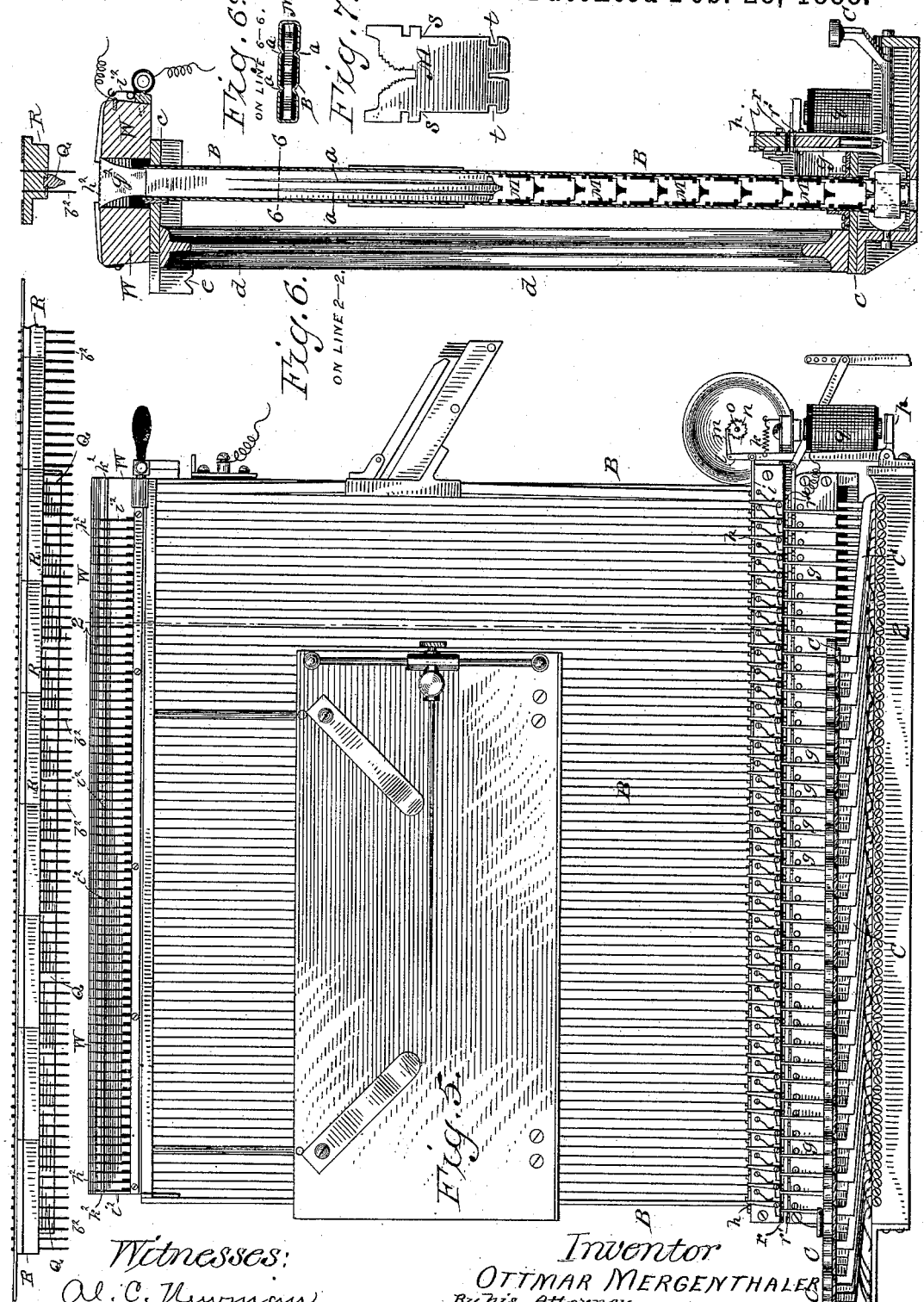

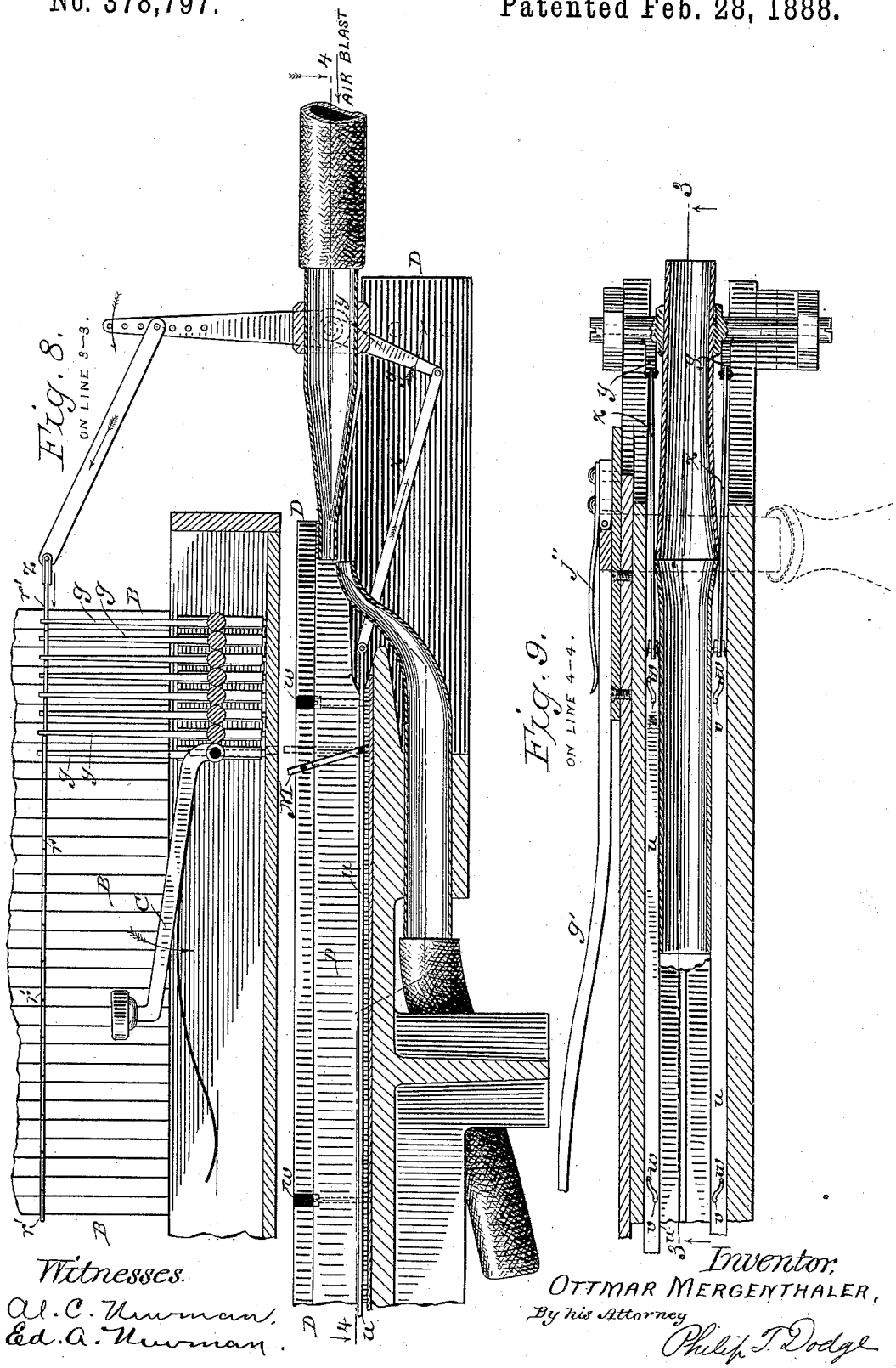

(No Model.)
O. MERGENTHALER.
MACHINE FOR FORMING TYPE BARS.
No. 378,797. Patented Feb. 28, 1888.

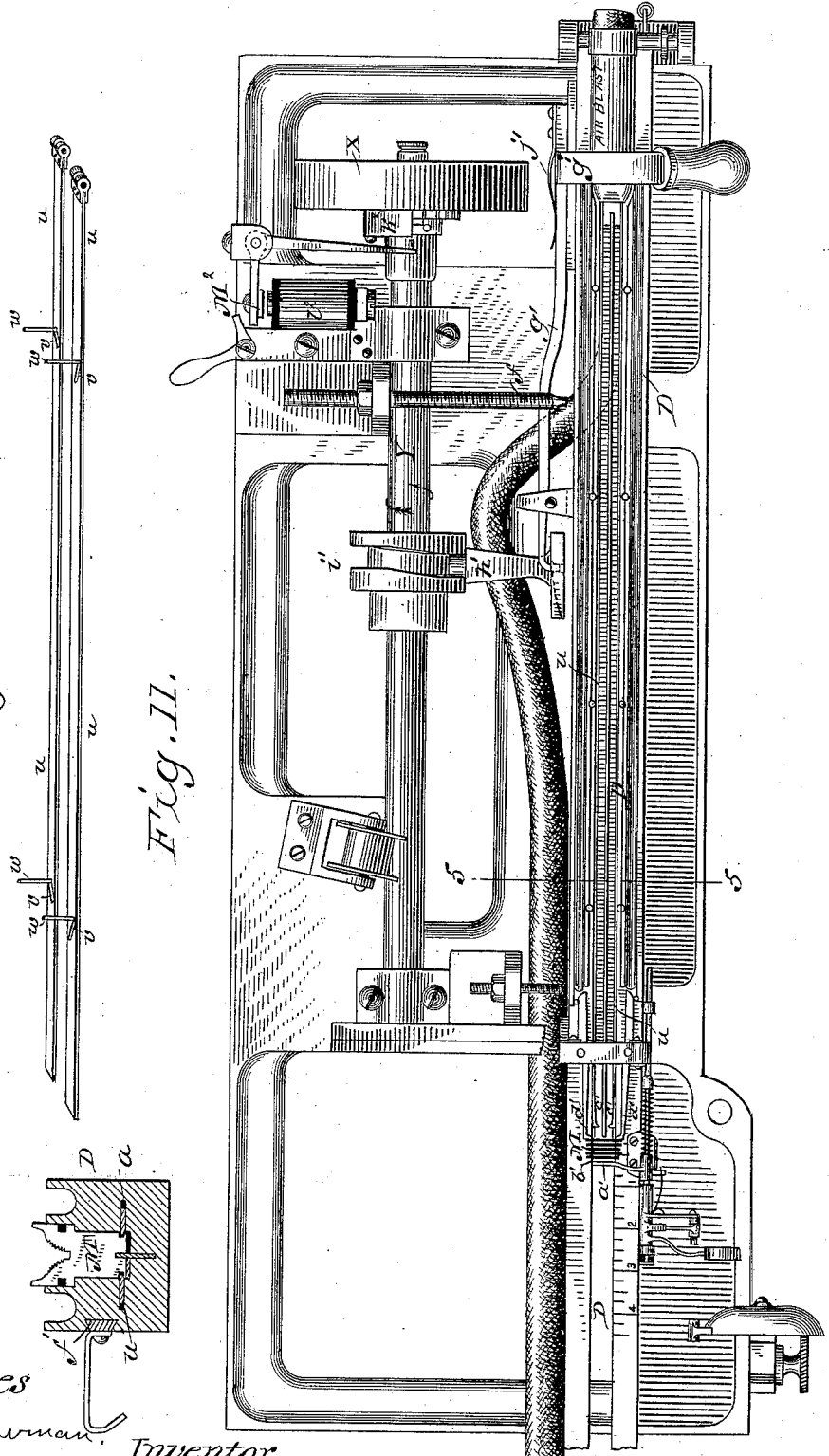

(No Model.) 16 Sheets—Sheet 9.
O. MERGENTHALER.
MACHINE FOR FORMING TYPE BARS.
No. 378,797. Patented Feb. 28, 1888.
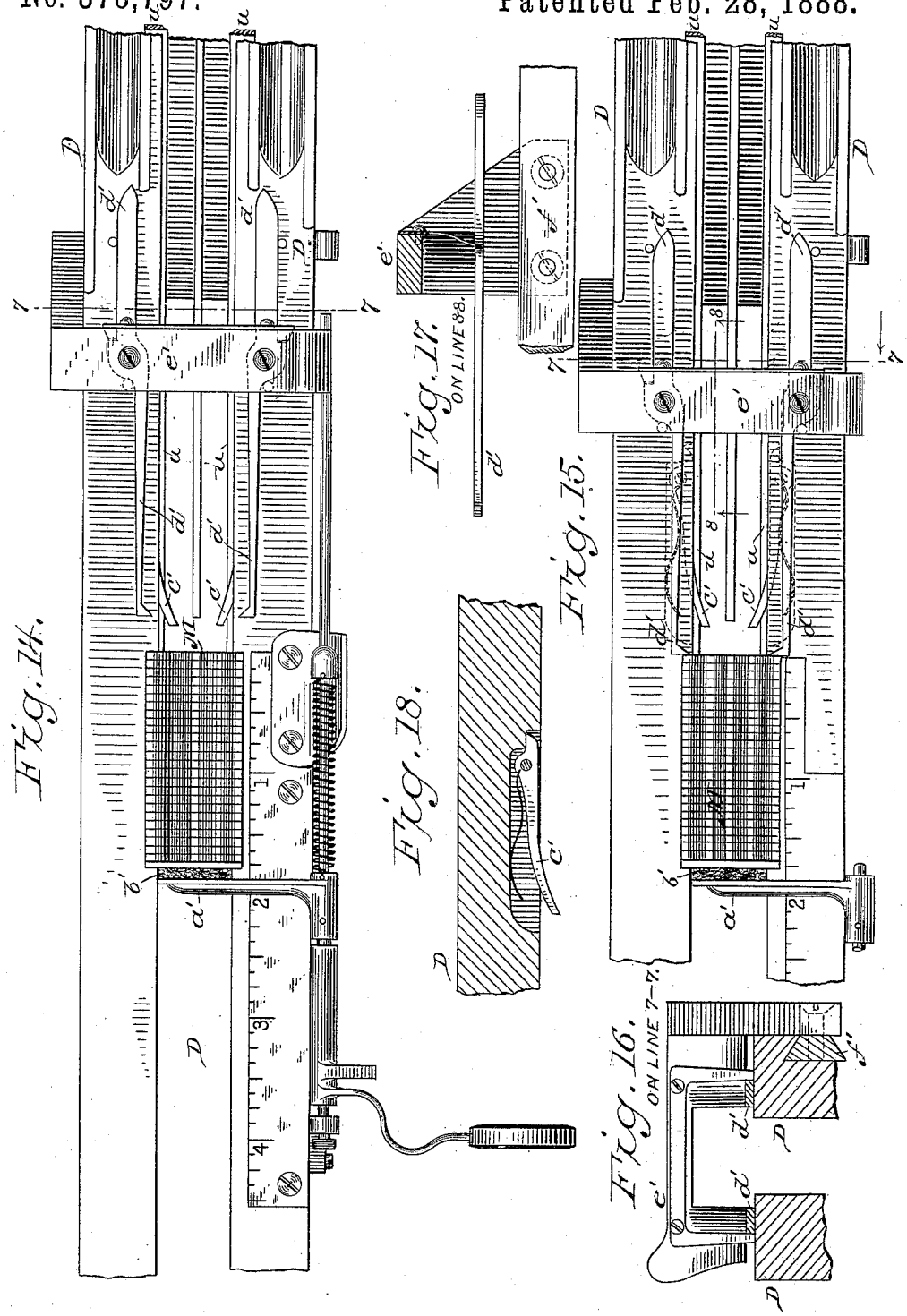
Witnesses:
Al. C. Newman
Ed. A. Newman
Inventor:
OTTMAR MERGENTHALER,
By his Attorney
Philip T. Dodge (No Model.) 16 Sheets—Sheet 10.
O. MERGENTHALER.
MACHINE FOR FORMING TYPE BARS.
No. 378,797. Patented Feb. 28, 1888.
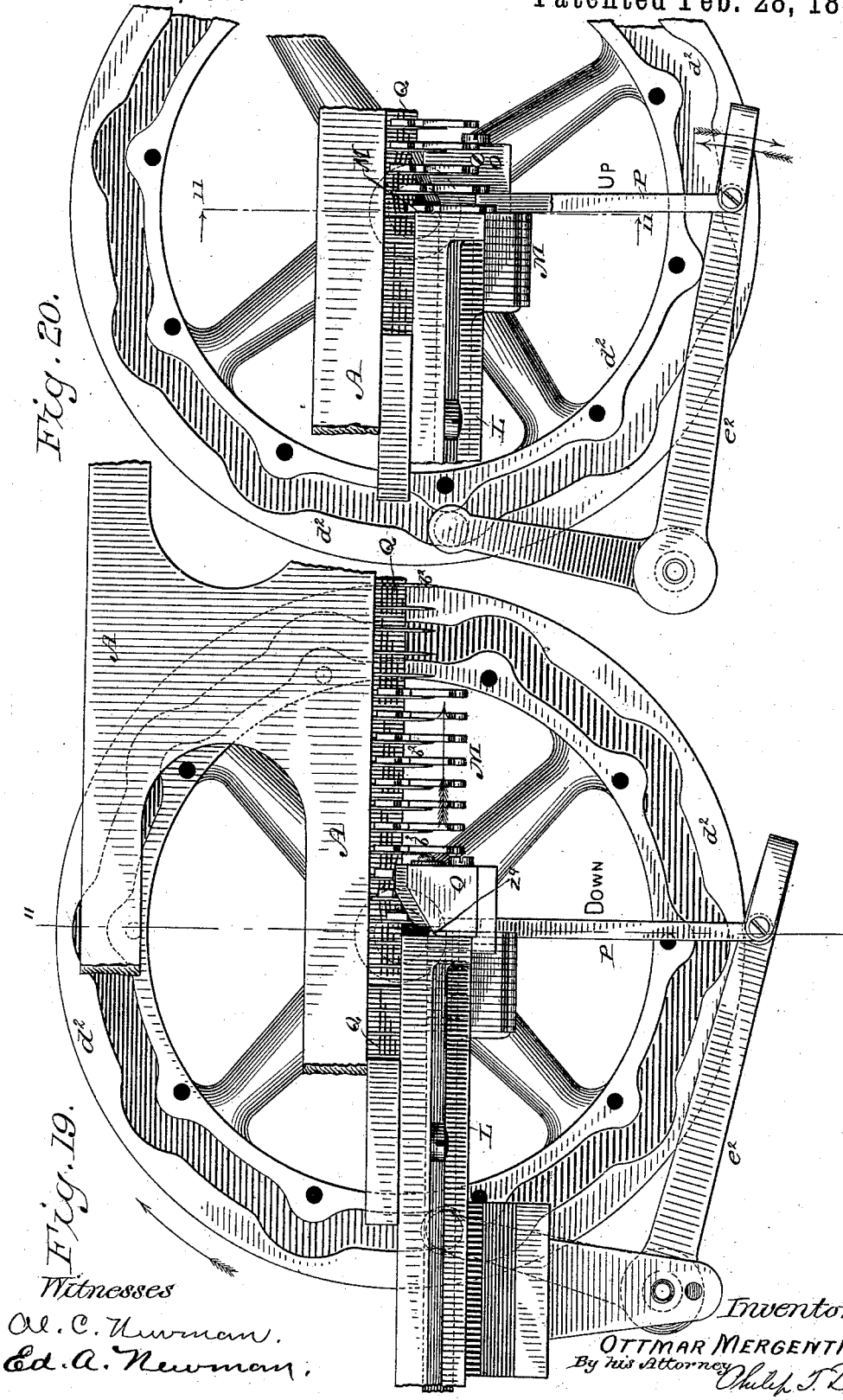

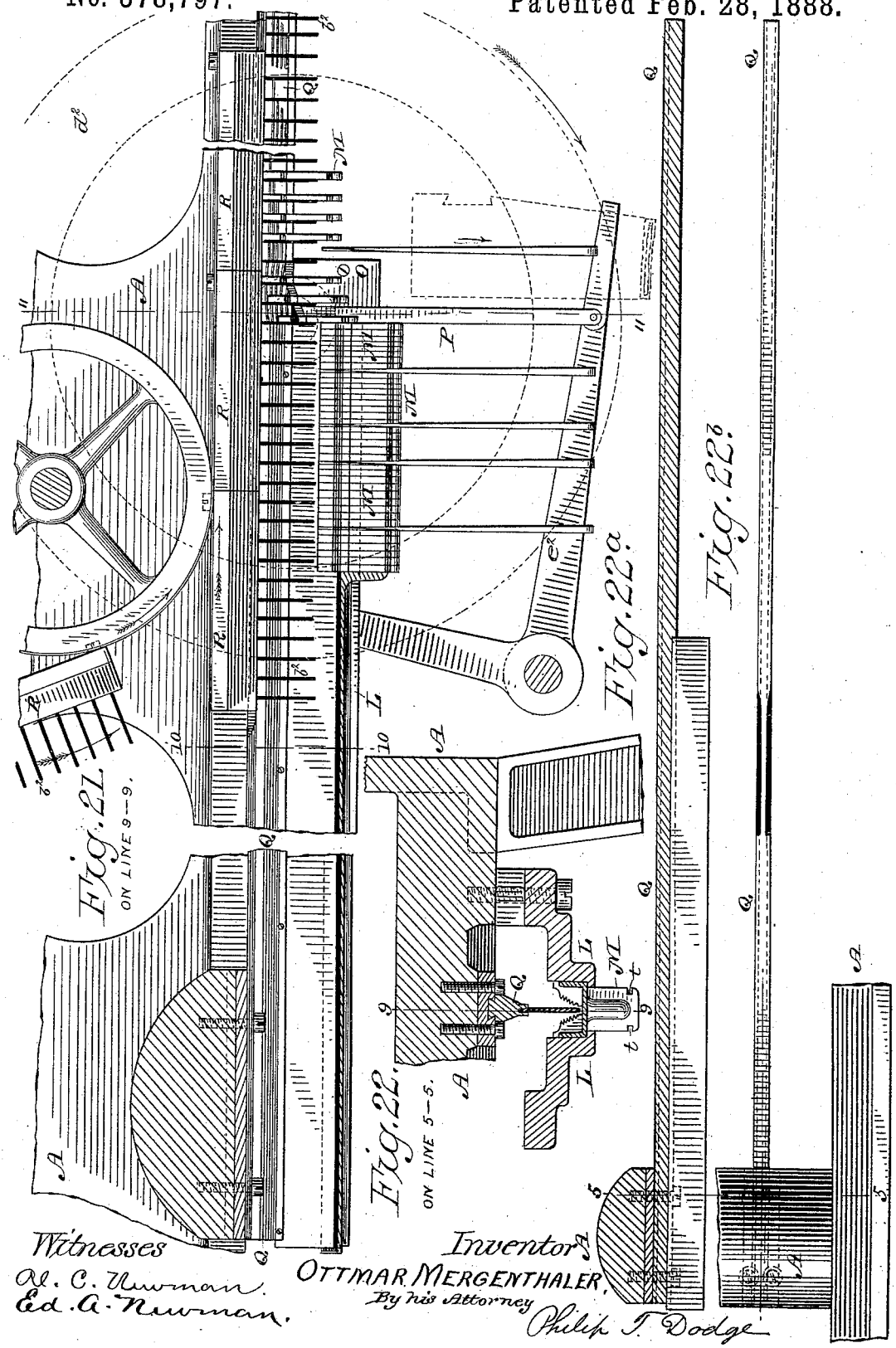

(No Model.) 16 Sheets—Sheet 12.
O. MERGENTHALER.
MACHINE FOR FORMING TYPE BARS.
No. 378,797. Patented Feb. 28, 1888.
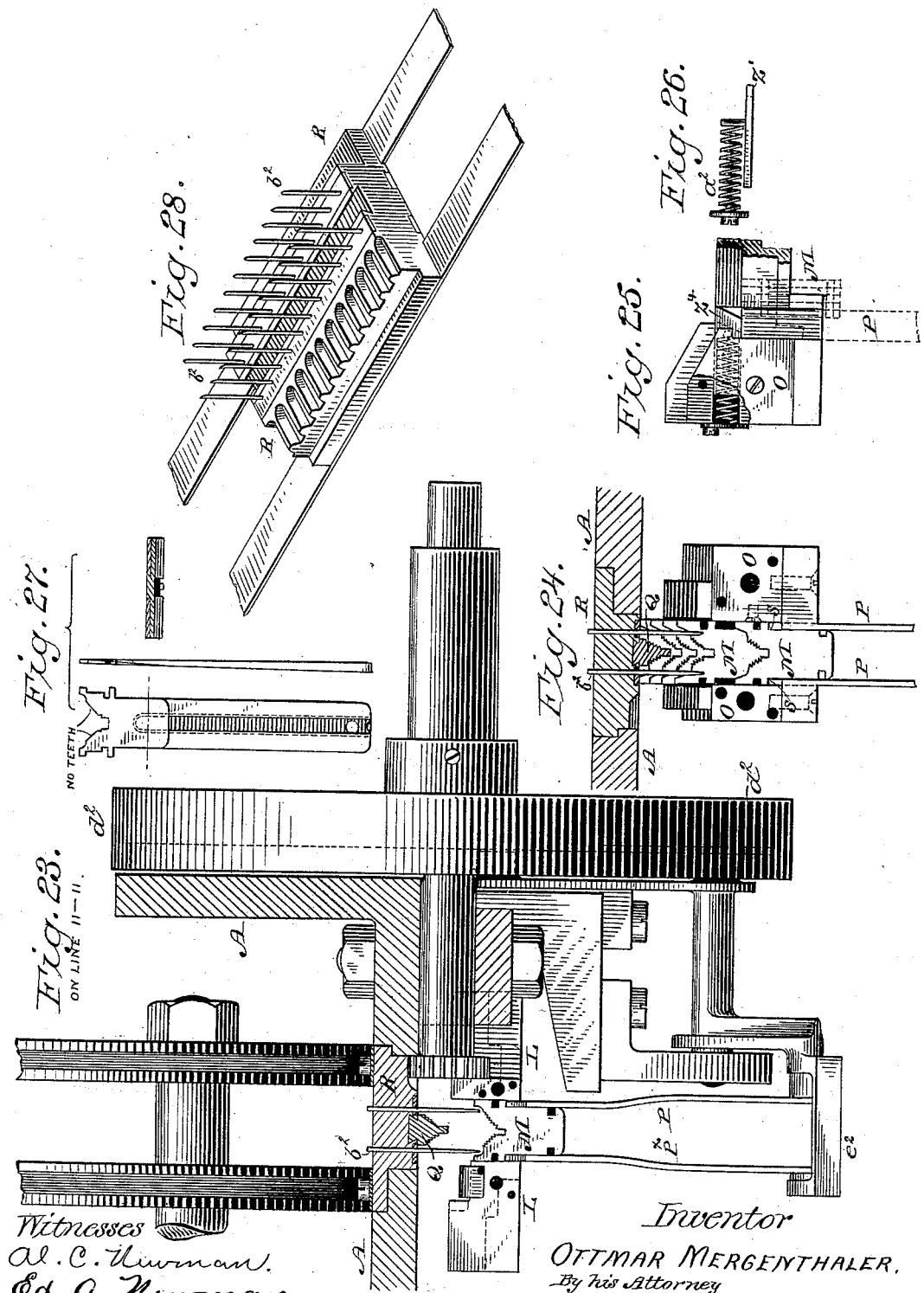

(No Model.) 16 Sheets—Sheet 13.
O. MERGENTHALER.
MACHINE FOR FORMING TYPE BARS.
No. 378,797. Patented Feb. 28, 1888.
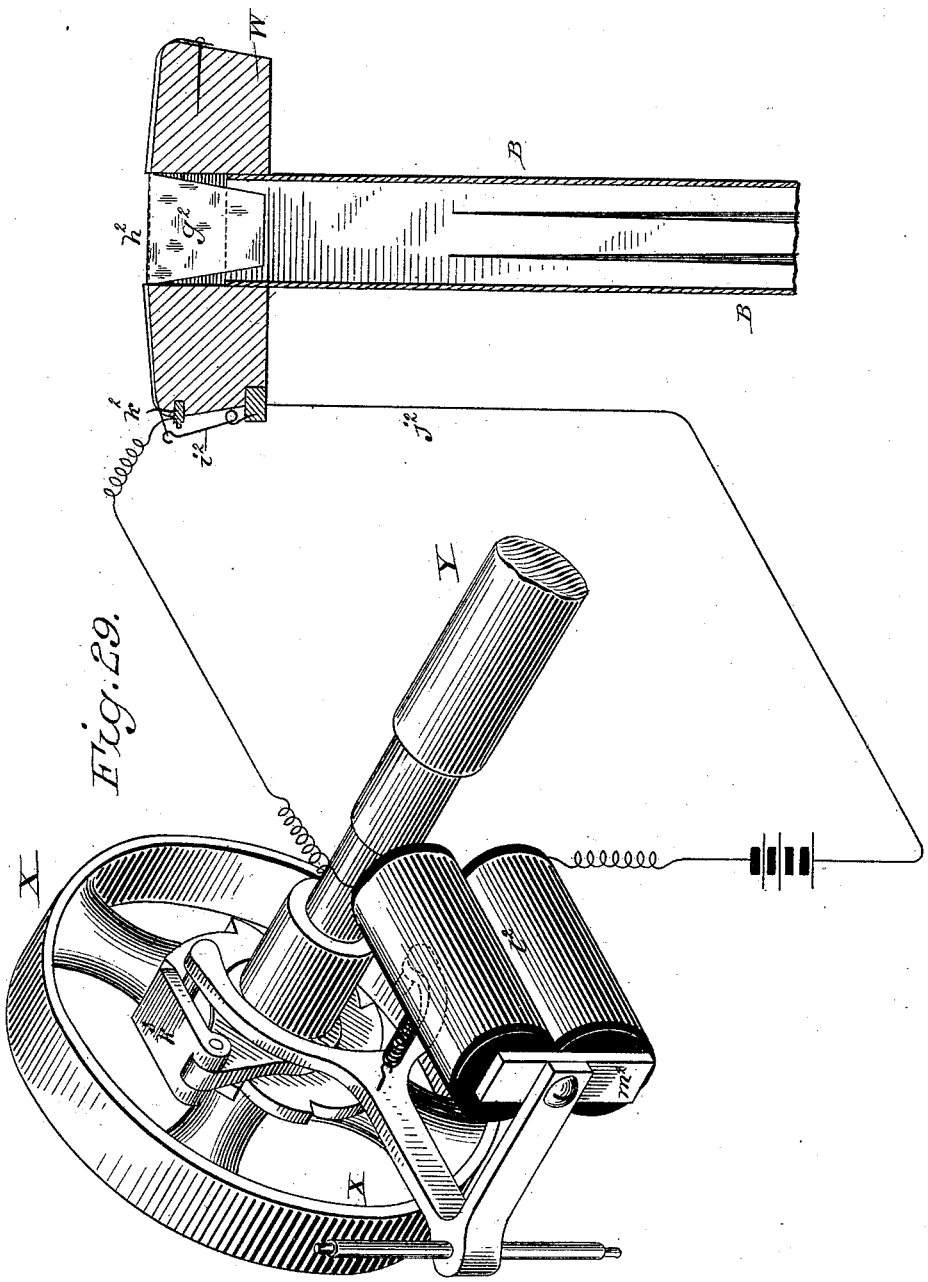
Witnesses
Al. C. Newman
Ed. A. Newman
Inventor
OTTMAR MERGENTHALER.
By his Attorney
Philip T. Dodge

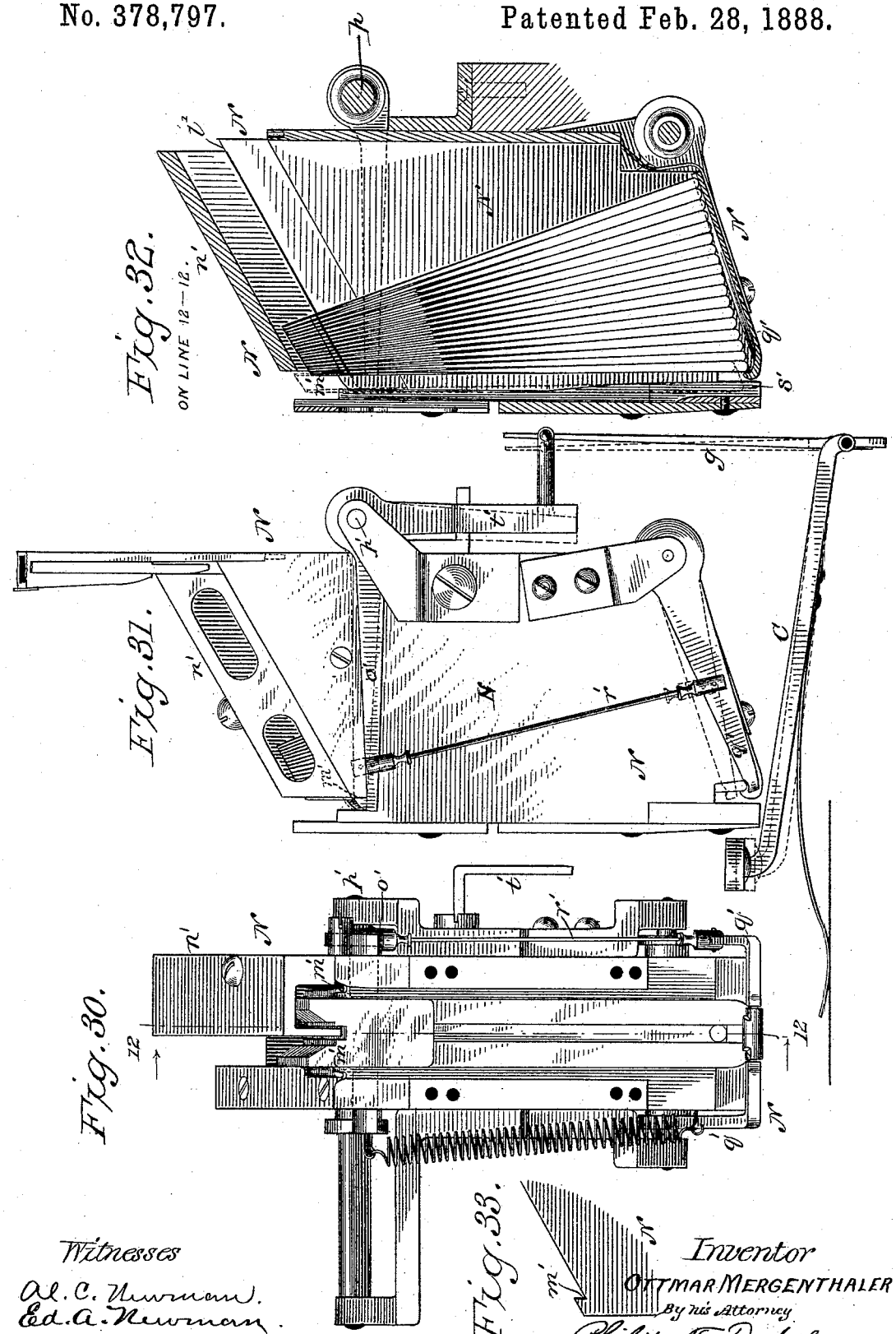

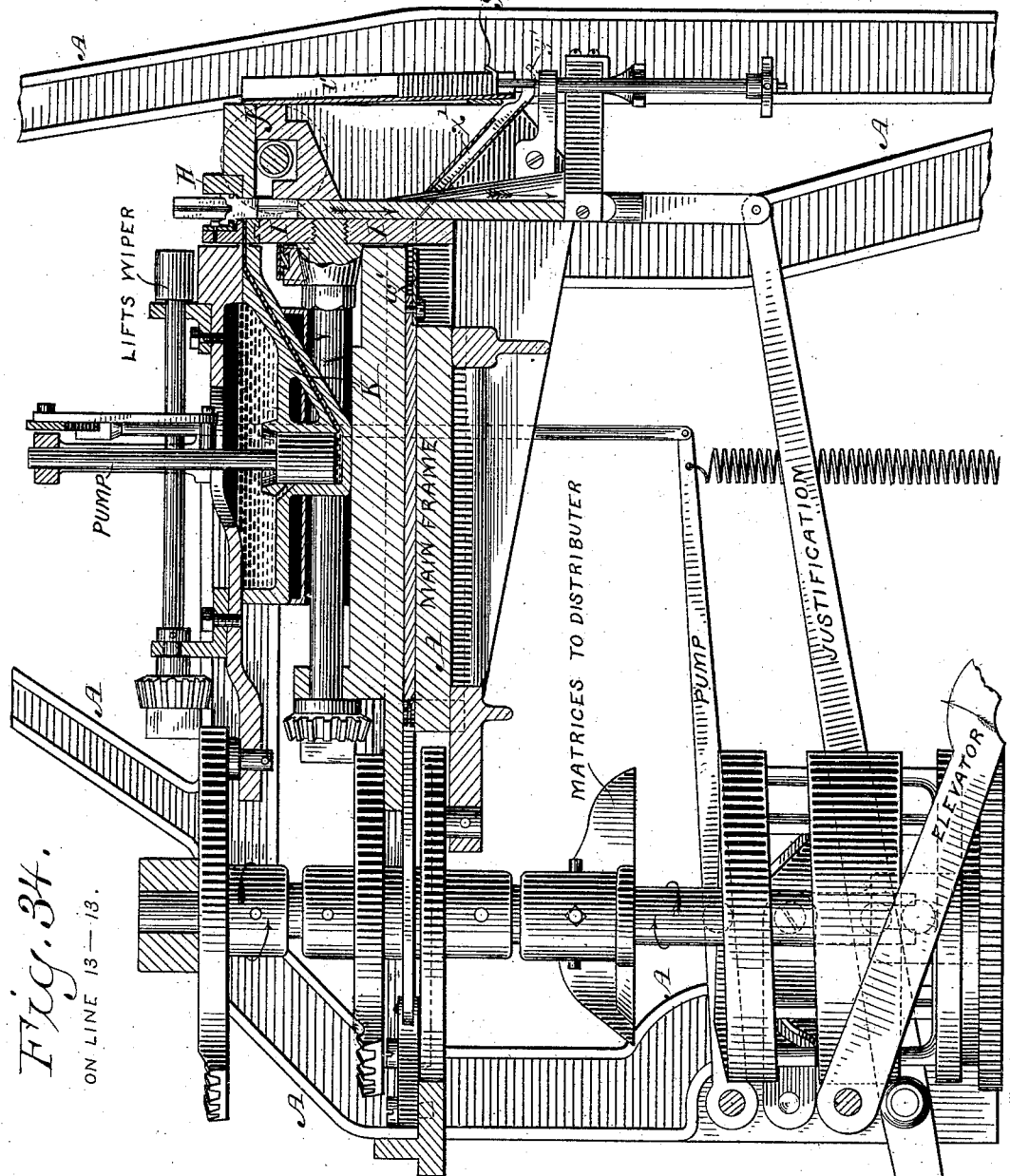

(No Model.) 16 Sheets—Sheet 16.
O. MERGENTHALER.
MACHINE FOR FORMING TYPE BARS.
No. 378,797. Patented Feb. 28, 1888.
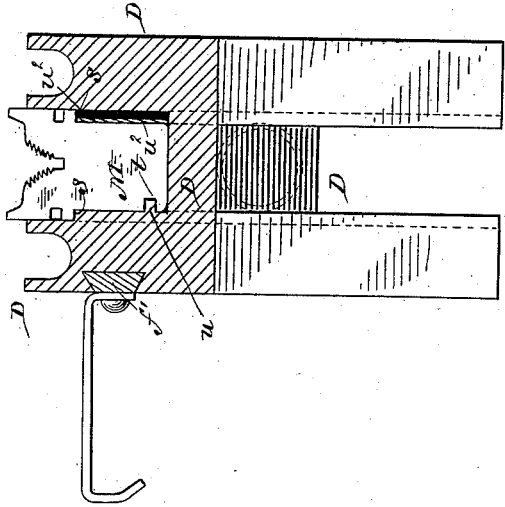
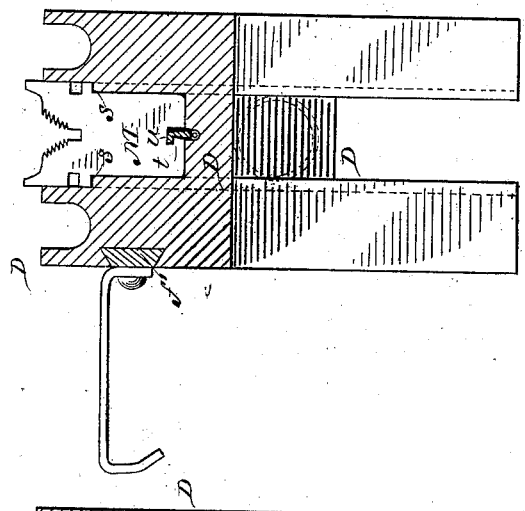
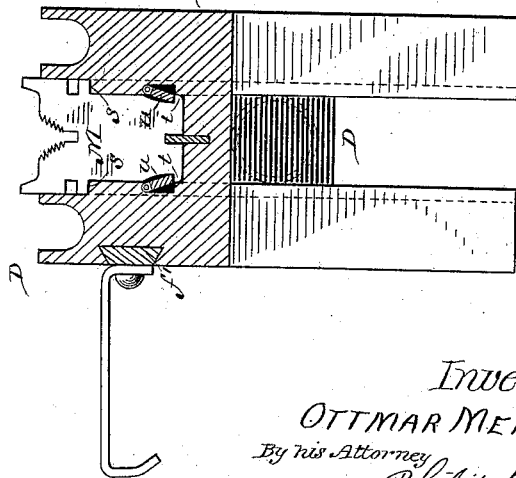
Witnesses
Al. C. Newman
Ed A. Newman
Inventor
OTTMAR MERGENTHALER
By his Attorney
Philip T. Dodge

United States Patent Office.

OTTMAR MERGENTHALER, OF BALTIMORE, MARYLAND, ASSIGNOR TO THE NATIONAL TYPOGRAPHIC COMPANY, OF WEST VIRGINIA.

MACHINE FOR FORMING TYPE-BARS.

SPECIFICATION forming part of Letters Patent No. 378,797, dated February 28, 1888.

Application filed March 23, 1886. Serial No. 196,270. (No model.)

*To all whom it may concern:*

Be it known that I, OTTMAR MERGENTHALER, of the city of Baltimore and State of Maryland, have invented certain Improvements in Machines for Forming Type-Bars, Type-Matrices, &c., of which the following is a specification.

The present invention relates to various improvements in those machines for casting type-bars in which a key mechanism serves to deliver individual matrices or type from magazine-tubes to a guide or conductor through which they are driven by a blast of air to the point of assemblage, whence they are delivered in a body to a casting mechanism by which a bar is formed bearing on its edge the characters of the entire line of matrices, after which the matrices are conveyed to a distributing mechanism which serves to return them to the respective tubes from which they started. Machines of this general type are represented in Letters Patent of the United States granted to me on the 12th day of May, 1885, No. 317,828, and on the 17th day of August, 1886, No. 347,629, and in application filed May 11, 1885, No. 165,138.

The present improvements have reference more particularly to the construction of the magazine-tubes; to means for holding the matrices in position during their passage through the guideway, so that they may not be displaced by the air-blast; to means for regulating the reaction of the finger-keys in order that the matrices may have time to escape from the magazine-tubes; to improved devices for retaining the matrices in close form during their assemblage; for transferring the assembled line to the casting mechanism; to details of the casting mechanism; to various details of mechanism for transferring the matrices after the casting operation to the distributing-bar and for advancing them over said bar; to means for automatically stopping the distributing in the event of a matrix binding or falling at an improper point, and to various features of minor importance.

While I have illustrated in the accompanying drawings, and will more particularly describe, my improvements as embodied in a machine for casting from molten metal bars type-high, each bearing the letters to print an entire line, such as represented at Figure 1ª, it is to be understood that many of the features may be employed in connection with machines using male type for the formation of matrices and in machines adapted for the production of relief-plates in page form—that is to say, with a series of lines thereon. As regards their external form and their combination with the delivering, assembling, clamping, and distributing mechanisms, matrices having intaglio characters and the type having cameo characters are to be considered mechanical equivalents.

Figure 2:
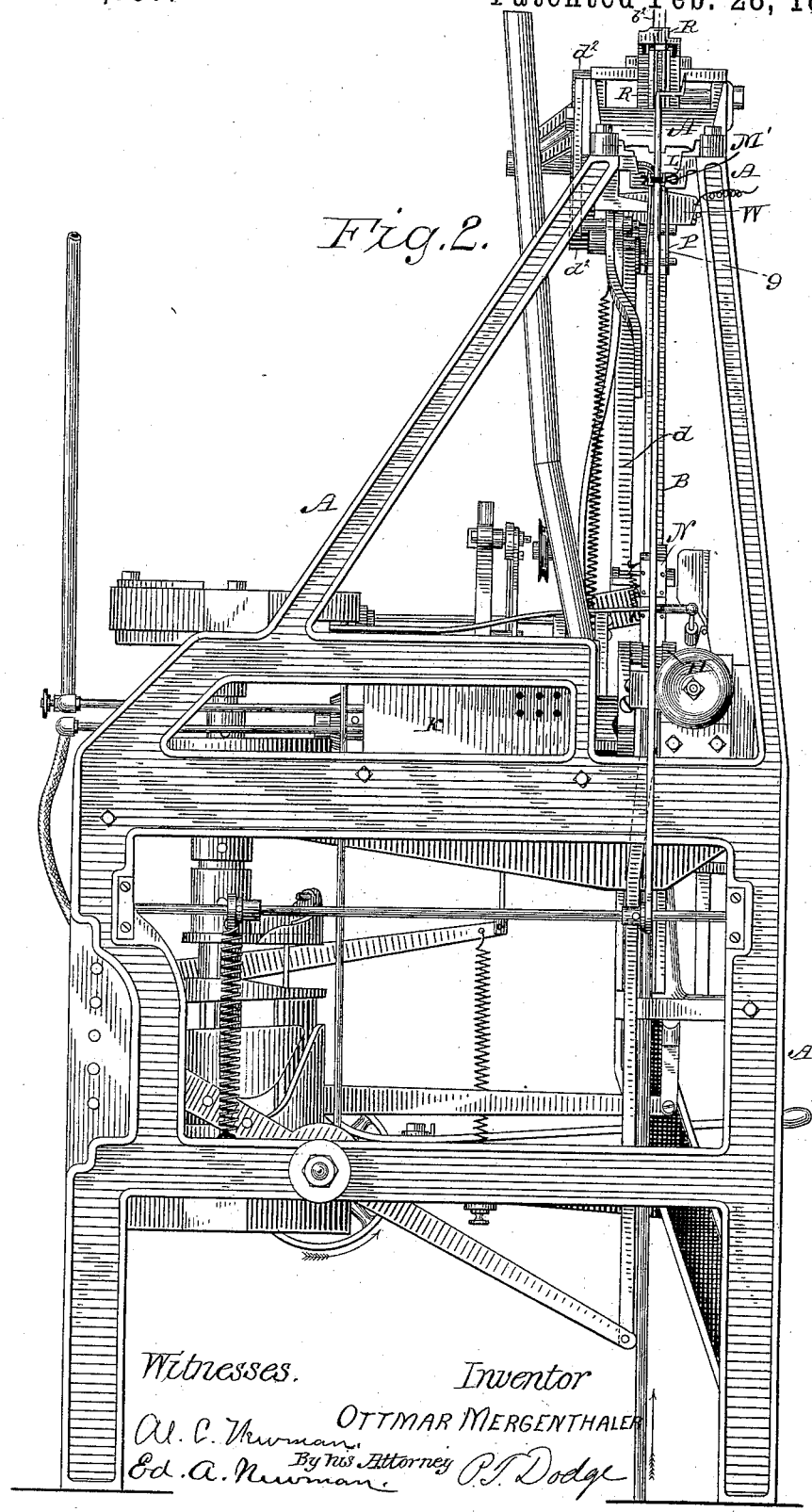
Figure 3:
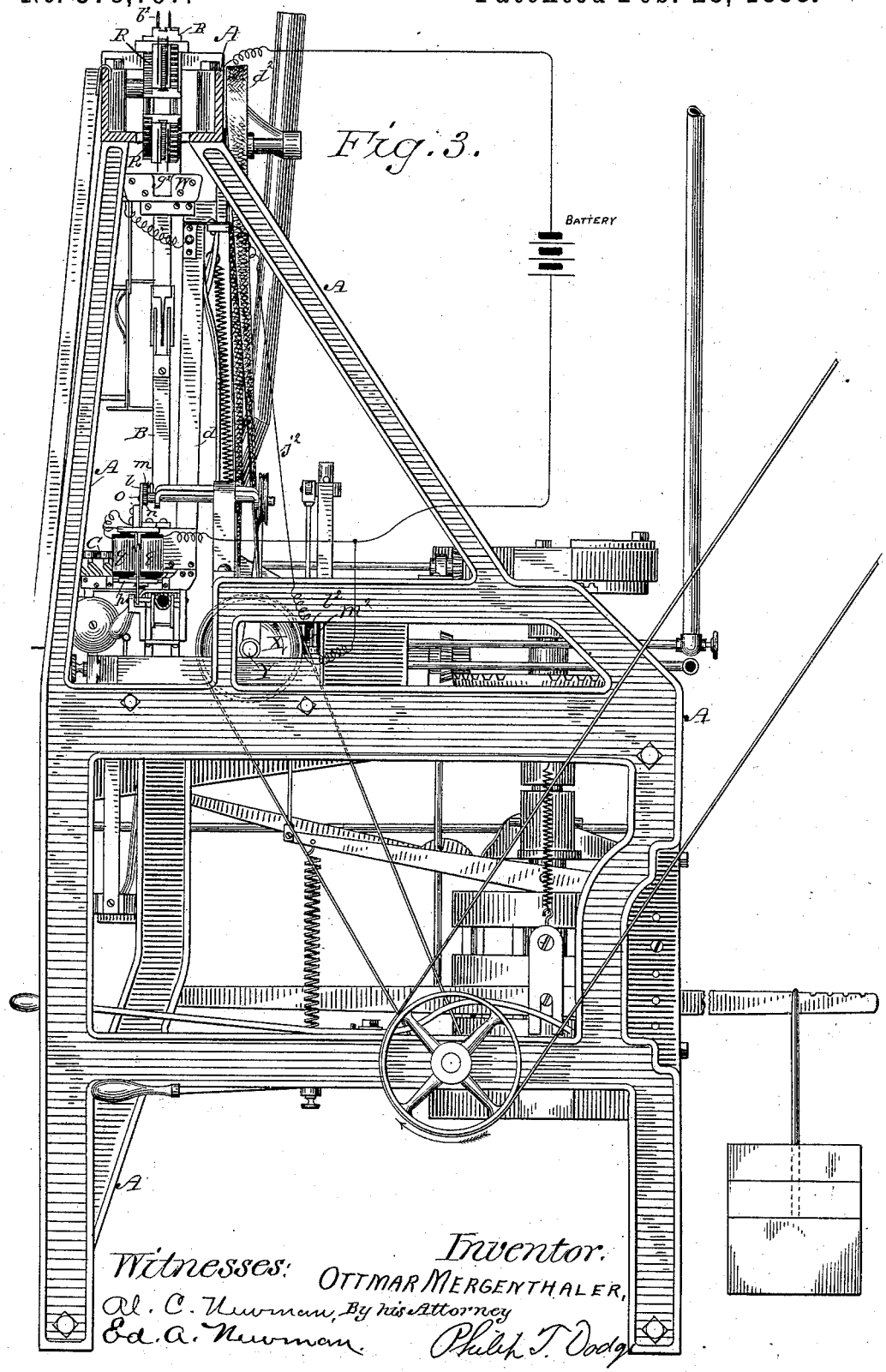
Figure 10:
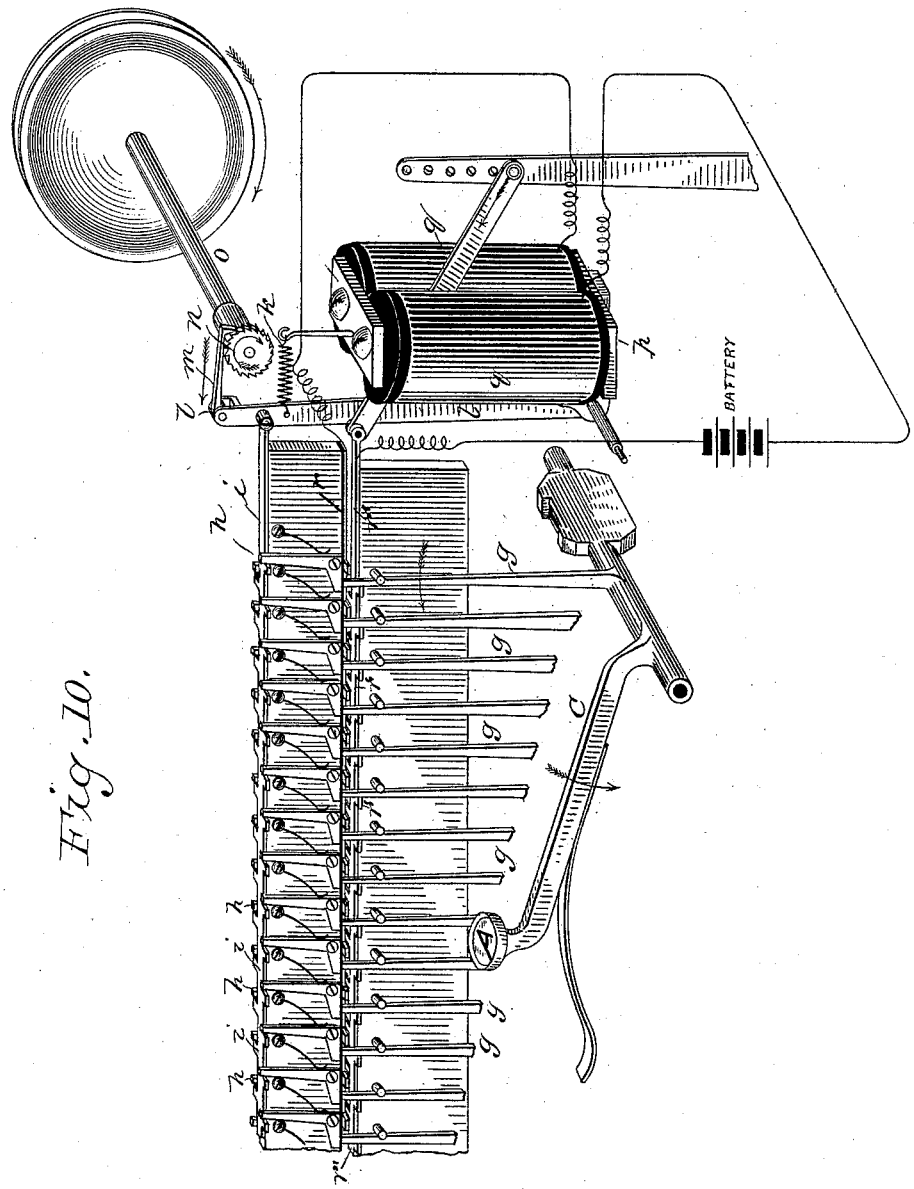

In the accompanying drawings, Fig. 1 represents a front elevation of a machine embodying my improvements. Fig. 1ª is a perspective view of one of the type-bars, the product of my machine; Fig. 2, an end elevation of the machine viewed from the left; Fig. 3, an end elevation of the machine viewed from the right. Fig. 4 is a cross-section on the line 1 1 of Fig. 1, showing more particularly the manner in which the magazine is suspended and the stop mechanism of the distributer, Fig. 5 is a front elevation of the magazine and its connections on an enlarged scale. Fig. 6 is a vertical cross-section of the same on the line 2 2 of the preceding figure. Fig. 6ª is a horizontal section on the line 6 6 of Figs. 5 and 6, showing the sectional form of the magazine-tubes. Fig. 7 is a side view of one of the matrices or type, showing particularly the notches to receive the locking-bar by which it is retained in the conductor-tube. Fig. 8 is a vertical longitudinal section on the line 3 3 of Fig. 9 through one end of the magazine, the key mechanism, the conductor-tube, and attendant parts, showing particularly the devices for locking the matrices in the conductor and the connection of said devices with the finger-keys. Fig. 9 is a horizontal section on the line 4 4 of the preceding figure. Fig. 10 is a perspective view showing the connections for retarding the return motion of the key mechanism to secure the dropping of the matrices. Fig. 11 is a top plan view of the bed-plate and attendant parts, showing the conductor tube or guide and the various devices for assembling the matrices and transferring the same to the casting mechanism. Fig. 12 is a vertical cross-section on the line 5 5 of the preceding figure, showing the arrangement of the locking-bars and the manner in which they engage the matrices. Fig. 13 is a perspective view of the locking-bars and their guide-pins detached. Fig. 14 is a plan view, on an enlarged scale, of the matrix-conducting rails or guides, together with the assembling and indicating mechanism used therewith, the movable pawls being retracted. Fig. 15 is a similar view with the movable pawls advanced against the matrices. Fig. 16 is a cross-section on the line 7 7 of Figs. 14 and 15, showing the frame by which the pawls are sustained. Fig. 17 is a vertical section on the line 8 8. Fig. 18 is a horizontal section through one of the conducting or guiding rails, showing one of the detaining-pawls and its actuating-spring. Fig. 19 is a side elevation of the mechanism by which the matrices are transferred from the upper supporting-rails to the distributing-rail and the devices for moving them over the latter, the lifting-finger being in its depressed position. Fig. 20 is a like view with the lifting-finger in its upper position. Fig. 21 is a longitudinal vertical central section on the lines 9 9 of Figs. 2 and 22, showing particularly the manner in which the distributing-rail is sustained. Fig. 22 is a vertical cross-section on the line 10 10 of the preceding figure. Fig. 22ª is a vertical longitudinal section through one end of the distributer-bar and its support, showing the manner in which it is connected at one end only to the frame. Fig. 22ᵇ is a top plan view of the same parts, illustrating particularly the manner in which its sides are cut away to permit the engagement of the carrier-plates by which it is supported. Fig. 23 is an elevation, partly in cross-section, on the lines 11 11 of Figs. 1, 19, 20, and 21. Fig. 24 is an end elevation, partly in section, of the distributer-rail and the devices shown in Figs. 19 and 20 for lifting the matrices thereto, together with attendant parts. Fig. 25 is a side view of one of the matrix-supporting rails and the inclines by which the matrices are guided therefrom upward to the distributing-rail. Fig. 26 is a top plan view of one of the spring-fingers shown in the preceding figure. Fig. 27 is a view showing in side elevation, in edge elevation, and in cross-section one of the justifying-bars. Fig. 28 is a perspective view of one of the carrier-plates by which the matrices are advanced over the distributer-rail. Fig. 29 is a diagram showing in cross-section the magazine and circuit-closing devices, and in perspective the driving-gear and its magnetic attachments connected with the circuit devices to stop the distributer. Fig. 30 is an end elevation of the devices for retaining the justifying or spacing slides and delivering the same, one at a time, to the line of matrices in course of composition. Fig. 31 is a side elevation of the parts shown in the preceding figure. Fig. 32 is a cross-section on the line 12 12 of Fig. 30. Fig. 33 is a side view showing the lips by which the space-bars are retained in the operating devices. Fig. 34 is a vertical cross-section on the line 13 13 of Fig. 1 through the casting mechanism and attendant parts, showing also, in side elevation, the various cams, gears, &c., for imparting motion to the principal parts of the machine. Figs. 35, 36, and 37 are cross-sections of the matrix guide or channel, showing modified forms of the devices for locking the matrices therein.

In its general organization the present machine resembles very closely that represented in my application filed October 21, 1885, No. 181,169.

Referring to Fig. 1, A represents a rigid main frame adapted to sustain the various parts hereinafter described; B, the magazine, consisting of a series of upright tubes arranged side by side; C, a key mechanism consisting of a series or bank of finger-keys—one for each magazine-tube—adapted to deliver the matrices one at a time therefrom; D, a horizontal conductor rail or channel into which the matrices are dropped one at a time in an upright position, and through which they are driven by a blast delivered from an air-nozzle, E, to the point of assemblage at the left hand of the conductor against a detaining-finger, F; G, movable pawls by which the line of assembled matrices is advanced over and beyond the rail D to the secondary lifting-rails H, which stand normally in line with the conductor D in position to sustain the matrices in front of the mold wheel or disk I; J, a horizontally-moving clamp by which the matrices suspended in the lifting-rails are forced backward against the mouth of the melting-pot K, from which the metal is received to fill the mold and form the type-bar.

L are horizontal overhead rails to which the matrices are transferred after being lifted from the mold by the rails H through the action of a reciprocating slide, M'.

O are inclined blocks up which the matrices ride with the assistance of a reciprocating finger, P, to the end of a stationary distributing-rail, Q, over which they are advanced by teeth depending from the traveling blocks R, attached to endless bands S, traveling around suitable guide-pulleys. The matrices drop from the rail at suitable points into the upper ends of the proper tubes to pass again through the machine.

I will now describe in detail the various improvements forming part of the present invention. Instead of constructing the magazine-tubes with smooth interior surfaces and of different widths corresponding to the thickness of the matrices which they are to receive, as in my former machine, I now form them of uniform size, and adapt them to receive type of different thicknesses by grooving or otherwise indenting them from the outside in such manner as to form internal ribs or projections, a, Fig. 6. These ribs will be raised to a greater or less extent on the interior of the tube, according to the thickness of the matrices to be contained therein, the distance between the ribs on opposite sides being in each case slightly in excess of the thickness of the matrix. The ribs, in addition to their other advantages, reduce the bearing-surface of the matrix within the tube, so that there is no danger of the matrix adhering to the walls or failing to descend the tube. They also afford a space around the exterior of the matrix for the passage of air, so that the matrix may drop readily through the tube without resistance. I commonly construct each tube of copper or like material in one seamless piece, and terminate the ribs or indentations at a short distance from the upper ends of the tubes, in order to leave the receiving ends or mouths of full size to facilitate the entrance of the matrices. The tubes are grouped side by side between horizontal bars c, secured to a rear frame, d, which is suspended by lugs e at its top from lips on the main frame, as plainly shown in Fig. 4, this arrangement permitting the entire magazine, with the key-board attached, to be lifted from the machine at will, as described in my previous application. In order to adjust the lower end of the magazine as desired, I provide the main frame with horizontal screws f, as shown in Fig. 4, to bear against the frame d.

The finger-keys C are of the same construction as those represented in Patent No. 347,629, before mentioned, as plainly shown in Figs. 8 and 10, each consisting of a rock-shaft having a lateral finger key or lever at one end, and at the opposite end a widened portion slotted vertically to admit of the matrix dropping therethrough from the magazine-tube into the conductor beneath. Each key has an upright arm, g, acting, as in the original machine, through intermediate devices to divert the air-blast from the conductor until the matrix is dropped into position in the latter.

As an appreciable time is required for the matrix to pass through and escape from the key, the key must be held momentarily in a depressed position, or otherwise there is a liability of the matrix being stopped in its passage. In order to relieve the operator of this labor, I provide the automatic key-retarding mechanism shown in Fig. 10. Over each key there is pivoted to the frame a spring-actuated dog, h. When the key is depressed to drop the matrix, this dog engages behind the arm g and holds the key down. Lengthwise of the machine there extends a sliding bar, i, having shoulders to trip all the dogs h, and thus release the finger-keys, that they may return to their original positions. This bar is urged forward to trip the keys by a spring, k, acting thereon through an arm, l. To prevent the instantaneous action of this spring, I connect to arm l a pawl, m, which engages a ratchet-wheel, n, on a shaft, o, which is driven by a pulley continuously and at a moderate rate of speed from the main shaft of the machine or any other constantly-moving part. The arm l, to which the spring k is connected, is of angular form, pivoted near its lower end, and provided at the lower end with an armature, p, in the field of the electro-magnet g, the attraction of which causes the bar i to overcome the strain of the spring and move to the left, thereby releasing the dogs h, that they may engage the arms g when the keys are depressed.

The magnet is mounted in a circuit embracing a battery or other generator and terminating in two disconnected conducting-plates, r and r', the former fixed in place and the latter arranged to reciprocate endwise. The two plates have lateral studs to encounter the key-arms g. These arms stand normally in contact with the studs of plate r', but out of contact with those of plate r, the circuit being open. When any key is depressed, its arm g urges the plate r' to the left, and finally encounters a stud on the plate r, thereby completing the circuit through said arm, whereupon the magnet, moving the bar i, permits the appropriate dog h to fall behind the arm g and hold the key down, the movement of the bar i at the same time retracting the pawl m, that it may engage anew in the wheel n. When relieved from the pressure of the finger, the key rises very slightly, causing its arm g, before encountering the dog, to leave the stud on the plate r, and thus open the circuit, so that the bar r' is relieved from the influence of the magnet. The bar i, under the influence of spring k, immediately commences to move to the right to effect the release of the dog and key; but as its movement is retarded by the pawl and wheel sufficient time is given for the matrix to escape from the key before the bar i reaches a point at which it acts on the dog. When the dog is disengaged by the bar i, the finger-key and the plate r' assume their normal positions, again opening the circuit, leaving the circuit open. The magnet is used in order that the bar i may be relieved from the action of the spring k for the time being, so that the dogs may engage the keys. As the spring k must be stronger than the springs which actuate the dogs, it will be seen that the constant strain of the spring k is inadmissible.

The essence of the foregoing improvement resides in the employment of a key-locking mechanism operated by a constantly-moving part of the machine to hold the key down for a proper period of time after the operator has removed his finger therefrom.

Owing to the violence of the blast employed for driving the matrices through the channel or conductor D, I find it advisable to hold them down in place therein during their passage therethrough. To this end I propose to use horizontal locking devices to engage the matrices in any manner which will admit of their sliding freely through the conductor, but prevent them from rising therefrom.

The matrices are made, as shown in Fig. 7, in essentially the same form as in my previous machines, with shoulders s on their edges near the top to ride on the side rails of the conductor, and thus maintain the matrix in an upright position therein. I now provide each matrix, in addition to the features heretofore employed, with the notches $t$ in its two edges near the lower end. In each side of the conductor D, near the bottom of its channel or passage, I mount a longitudinal and horizontally-movable plate or locking-bar, $u$. (Plainly represented in Figs. 8, 9, 12, and 13.) These bars are provided with oblique grooves $v$, through which fixed vertical pins $w$ are passed, as shown in Fig. 13, so that when the bars are moved endwise in one direction they will slide outward from the conductor, in order to permit the matrix to descend therein. On being moved in the opposite direction they will slide into the conductor and enter the notches in the edges of the matrix, as plainly shown in Fig. 12, thus securing the matrix within the conductor, leaving it, however, free to slide in its upright position through the conductor to the point of assemblage or composition. It is to be distinctly understood that I do not restrict myself to this form or arrangement of the locking devices. A single blade on one side or in the middle, or blades which tip instead of sliding, or guides made in other forms, may be substituted for those shown in the drawings, the only requirement being that the guides shall be capable of moving outward to admit the matrix to the conductor, and subsequently moving inward to retain the matrix in position. In order to secure the positive action of these locking-blades, I connect them with each and all of the finger-keys in such manner that when the key is depressed to deliver the matrix into the conductor it will retract the slides, and that when the key rises it will permit the slides to engage the matrix just dropped between them. A simple arrangement to this end is shown in Figs. 8 and 9, in which $x$ represents links extending from the locking-rails $u$ to arms $y$, extending downward from the shaft of the vibrating nozzle, which is in turn connected, as in my previous machine, with a bar, Z, actuated by the arms of the finger-keys. Of course any equivalent connection between the finger-keys and locking-rails may be employed.

The several parts are so arranged and proportioned that the matrices may assume a moderate forward inclination while passing through the conductor, as shown in Fig. 8, it being found that in this position they ride with increased freedom and without danger of binding or clamping.

For the purpose of arresting the matrices as they are driven from the conductor by the blast, so that they may be assembled in close order, I provide, as in previous machines, a yielding and laterally-movable detaining-arm, $a'$, which overlies the conductor-rails, as shown in Figs. 14 and 15. This yielding detent is the same as that represented in application No. 181,169, except that its face is now provided with a cushion or yielding surface, $b'$, for the purpose of lessening the noise and relieving the wear and shock as the successive matrices are added to the line.

For the purpose of preventing the matrices from rebounding as they encounter those which precede, I mount in the inner walls of the conductor-rails two pivoted spring-actuated pawls, $c'$, which permits the matrices to pass freely in a forward direction, but prevent them from returning. For the purpose of adding the successive matrices positively and closely to the line and of advancing the line positively as the matrices accumulate, I provide the horizontally reciprocating pawls $d'$, attached to an arched yoke or bar, $e'$, which spans the conductor, as shown in Fig. 16, so that the matrices may pass freely thereunder. This yoke is attached, as in my previous machine, to a dovetailed bar, $f'$, sliding in a groove in the side of one of the conductor-rails. As shown in Figs. 9 and 11, the bar $f'$ is pivoted at one end to a hand-lever, $g'$, having a finger which may be engaged at will in a plate, $h'$, constantly reciprocated by a grooved cam-wheel, $i'$. These connections impart a constant reciprocation to the pawls $d'$, causing them to feed the matrices forward one after another as they are delivered by the blast in reach of the pawls. The lever $g'$ is held in engagement with the actuating arm by a spring, $j'$. It may be unlocked at will, and when thus unlocked it may be carried to the left, so as to advance the pawls $d'$ beyond their ordinary position, causing the pawls in turn to advance the assembled line of matrices over the conductor or guide to the lifting and sustaining rails H in front of the mold-wheel. These parts differ only in the details of construction from those represented in my application last referred to. The expansive space-bars are constructed in two parts of wedge form, as described in my Patents No. 345,525, July 13, 1886, and No. 347,629, August 17, 1886, and are grouped and retained in position above the conductor D, so that they may drop one at a time into the conductor as the line of matrices is assembled. I now use for the purpose of supporting these space-bars, which are provided with sustaining-shoulders at their upper ends, the peculiar devices represented in Figs. 30, 31, 32, and 33. A box or receptacle of suitable size to receive the space-bars in an upright position is provided with inclined upper edges or walls, $l'$, on which the shoulders of the space-bars are supported and down which the bars descend by gravity toward the front. Near their lower ends these supporting-walls are formed with shoulders $m'$, against which the shoulders of the foremost bar engage, thus preventing their further descent. A cap, $n'$, is applied to the box in position to cover the upper ends of the space-bars, excepting only the one at the front, so that they may not be lifted out of position. The forward bar has its shoulders exposed beyond this cap in position to be acted upon by the ends of two vertically-vibrating arms, $o'$, secured to a rock-shaft, $p'$. The lower end of the forward bar is also exposed to the action of a lifting-arm, $q'$, connected with the upper arms by a rod, $r'$, so that they rise and fall in unison. When the arms rise, they lift the shoulders at the upper end of the forward bar clear of the detaining-shoulders $m'$, over which the shoulders pass, whereupon the bar descends through a vertical opening or passage, $s'$, in the front of the box. The bar thus released descends through the opening by gravity to the conductor D and is added to the line of matrices.

It is to be observed that the arms $o'$ and $q'$ can release but one space-bar at a time, and that the escape of each bar is followed by the advance of the others. The discharging-arms may be operated in any appropriate manner; but I commonly provide the rock-shaft $p'$ with a depending arm, $t'$, connected with and operated by one of the finger-keys, as shown in Fig. 31.

The line of assembled matrices, together with the space-bars therein, after being transferred to the secondary rails H, are suspended by the latter in front of the mold-wheel, and are held by the clamp J against the face of the mold and by laterally-acting jaws on the clamp J in intimate contact with each other, as in my Patent No. 347,629, to which reference may be made for a detailed description thereof, it being deemed unnecessary to describe these features more fully in the present application, for the reason that they form no part of the present invention.

The construction of the casting mechanism, the one in which the mold and the matrices are presented thereto, and the action of the clamp upon the matrices are plainly illustrated in Fig. 34. The mold-wheel has the mold extended therethrough, and is revolved, as in the previous machine, in a vertical plane subsequent to the casting action, in order to bring the mold-opening and the casting opposite a horizontally-reciprocating ejector, $w'$, by which it is expelled at the front.

For the purpose of properly assembling the bars as they are delivered I now form through the main clamp, as shown in Fig. 34, an opening with a downwardly and forwardly inclined face, $x'$, over which the bars descend by gravity to the front, where they are received on a lifting-plate, $y'$, and carried upward one after another into a galley, $z'$, provided with retaining-springs, as in the previous application. The details of this lifting-plate and of the mechanism for operating the same are not claimed herein, as they will constitute in an improved form the subject-matter of a separate application.

Passing, now, to the distributing mechanism, attention is directed to Figs. 1, 4, 19, 20, 21, 22, and 23 to 28. The lifting-rails H rise until they form a continuation of the stationary rails L, whereupon the horizontal slide M', advancing, as in the previous machine, under the action of a spring, forces the matrices and type-bars from the rails H to the rails L, on which they hang suspended by their shoulders. As the matrices are urged forward under the constant pressure of the slide M', the foremost matrix encounters two stationary blocks, O, by which it is arrested. These blocks have inclined upper surfaces, as shown in Figs. 1, 19, 20, 24, and 25, to which the shoulders of the matrices are lifted one at a time by the action of the vertical fingers P, so that their shoulders may ride upon the inclined surfaces. Horizontally-sliding plates $z^4$, urged forward by springs $a^2$, are seated in the blocks O and bear against the ends of the stationary rails, as shown in Fig. 25, above the upper ends of the lifting-fingers. The ends of these slides are beveled, so that as the fingers rise the slides will yield and allow the fingers to pass upward. These slides serve as automatic supports for the matrices, yielding sufficiently to allow the wide matrices to pass upward under the influence of the lifting-fingers P and closing in such manner that matrices will be prevented from falling therethrough, as would be liable to occur were the opening to remain of constant width. The distributer-rail Q is substantially identical with that described in Patent No. 347,629, being provided on its side with longitudinal teeth differing in number and arrangement at different points in the length of the bar and adapted to co-operate with corresponding teeth in the respective matrices, so that each matrix while advancing along the bar is suspended thereby until it reaches its appropriate magazine-tube. This distributer-rail is now secured rigidly to the frame at its forward end by screws, as shown in Figs. 21, 22, 22$^a$, and 22$^b$. It is sustained throughout the remainder of its length by the overlying traveling carrier-plates R. These plates slide during their advance, as shown in Fig. 23, on ways or guides formed in the top of the main frame, as in the former machine. In their under faces the plates are provided with dovetailed grooves. The upper edge of the distributing-rail is made of corresponding dovetailed form, and the parts are so arranged that as the successive plates descend to an operative position at the front of the machine they ride upon and engage the upper edge of the rail, which is firmly supported thereby throughout its entire length. In order that the plates may thus engage the rail, its dovetailed rib is cut away at a suitable point, as plainly represented in Fig. 22$^b$.

In my present application the traveling carrier-plates are provided, as in the former machine, with depending pins $b^2$. These pins, instead of being arranged to slide vertically through the blocks, as in the former machine, are now fixed rigidly therein, so that they project at all times beyond the face of the block. This construction is rendered possible by the fact that the lifting-fingers P and the co-operating inclines now lift the matrices from the lower level to the level of the distributing-rail, the matrices passing upward between the pins instead of the pins descending between the matrices. The carrier-plates are provided, as in the previous machine, with gear-teeth on their rear faces, and they are advanced by a pinion on the shaft of a cam-wheel, $d^2$, which actuates an elbow-lever, $e^2$, operating the lifting-fingers, as before. To insure the placing of the matrices on the end of the distributer-rail with smoothness and certainty, I prefer to construct the rail with the receiving-teeth at its forward end curved upward directly over the lifting-blocks O, as shown in Fig. 21. By this construction the matrices will be delivered to the sustaining-teeth with a slight falling motion, which is highly favorable to smoothness of action.

In order to prevent the possibility of injury to the parts in the event of a matrix binding on the rail, or of its dropping from the rail to the mouth of a tube so small that it cannot enter, I have provided, as a measure of protection, the automatic mechanism shown in Figs. 1, 4, 5, 6, 11, and 29 for stopping the motion of the carrier-plates R. Immediately above the magazine-tubes and extending across the entire series there is a frame, W, open in the center and divided transversely between the respective tubes by flexible partitions $g^2$, between which the matrices pass in entering the tubes. Through or adjacent to the upper edge of each of these partitions there extends a horizontal thread or flexible wire, $h^2$, fixed at one end and connected at the opposite end to a conducting-finger, $i^2$, all of which fingers are attached to a bar forming one side of an electric circuit, $j^2$. Beneath the upper ends of the fingers $i^2$, and normally out of contact therewith is a conducting-bar, $k^2$, forming the opposite terminal of the circuit. Whenever a matrix is forced laterally against one of the partitions, the thread is caused to draw the finger $i^2$ against the bar $j^2$, thereby closing the circuit, which, as presently described, has the effect of disengaging the mechanism by which the carrier-plates are operated. As shown in Fig. 29, X represents a continuously-revolving driving-pulley mounted loosely on the shaft Y, through which motion is transmitted to the carrier-plates R. The pulley is connected with the shaft Y through the medium of a clutch mechanism containing driving-pawl $k^3$. The electric circuit before alluded to contains an electro-magnet, $l^2$, provided with a pivoted armature, $m^2$, having at one end an arm to ride beneath the pawl $k^3$, and thus throw the clutch out of engagement. Under the normal position of the parts, the circuit being open, the retracting-spring holds the armature away from the magnet, and the clutch is permitted to remain in action. When, however, the circuit is closed, the magnet attracts the armature, which immediately disengages the clutch, allowing the carrier-plates to cease their motion, although the motion of the driving-pulley is continued.

In Fig. 35 the locking-bars $u$ are seated in longitudinal grooves in the inner walls of the guide and pivoted at their upper edges, so that their lower edges may swing outward into the notches of the matrices.

In Fig. 36 a single locking-bar, pivoted at its lower edge and seated in the middle of the guide at its bottom, has a longitudinal lip on its upper edge to engage a notch or shoulder in the lower end of the matrix, as shown.

In Fig. 37 the locking plate or rib $u$ is fixed in position on one of the inner walls of the guide, and the matrices are forced into engagement therewith by a laterally-moving plate, $u^2$, acting against the matrices at the opposite edge to force them laterally.

Locking devices in the above forms may be connected with and operated by the finger-keys in any suitable manner.

While I have referred herein more particularly to matrices, it is to be understood that the assembling and distributing mechanisms may be used in connection with type or dies having the characters in relief thereon, and for this reason the words "type" and "matrices" are to be considered in the following claims as synonymous or equivalent terms.

Having thus described my invention, what I claim is—

1. A magazine-tube for matrices or type, provided on its inner surface with ribs or projections, substantially as described and shown, whereby the matrix is enabled to descend freely through the tube.

2. A magazine for holding type of different thicknesses, consisting of a series of tubes of uniform size provided with internal ribs or projections extending inward different distances in the respective tubes, according to the width of the type to be contained therein.

3. A magazine-tube for matrices or type, consisting of a sheet-metal tube indented or creased from the outer side to form longitudinal ribs on the inner surface, substantially as described.

4. The herein-described method of forming magazine-tubes for type of different thicknesses, consisting in forming rectangular tubes of uniform size and subsequently creasing or indenting said tubes longitudinally from the outer side inward.

5. The magazine-tubes provided with the longitudinal inwardly-projecting ribs extending upward from their lower ends, but terminating below the upper ends, whereby the tube is adapted for the free admission of the matrices at its upper end.

6. In a mechanism for composing type or matrices, the combination of a main frame with a detachable secondary frame, $d$, connected, substantially as described, to the upper and lower ends of a series of magazine-tubes, and provided at its upper end with supporting-shoulders to engage the main frame, said parts constructed, substantially as described, to admit of the magazine being lifted bodily from the main frame at will.

7. In combination with the main frame having an overhead support therefor, the removable frame $d$, having the series of magazine-tubes and a key mechanism connected thereto.

8. The removable frame $d$, provided with the magazine-tubes and a key mechanism, in combination with the main frame provided with the lip or shoulder to sustain the frame $d$, and with screws $f$, whereby the lower end of the magazine and the key mechanism may be adjusted horizontally.

9. In a composing mechanism, a series of upright magazine-tubes, a secondary frame to which they are secured, a main frame from which the secondary frame is suspended, and adjusting devices, substantially as described, to effect the horizontal movement of the tubes at the lower end.

10. The combination of a magazine-tube, the finger-key and its connections to deliver the type from the tube one at a time, and the automatic lock, substantially as described, to hold the key momentarily in its depressed position.

11. In a composing mechanism, the magazine-tubes, the finger-keys to discharge the matrices or type therefrom, the dogs or detents $h$, to lock said keys in their depressed positions, the bar $i$, to unlock said dogs, its actuating-spring, and the constantly-rotating ratchet-wheel $n$, connected by intermediate devices with the bar $i$, whereby said bar is prevented from unlocking the keys until a predetermined time has elapsed.

12. The finger-keys, their locking-dogs, the plate $i$, to unlock said dogs, its actuating-spring, the ratchet-wheel driven from a constantly-moving part of the machine and connected with plate $i$, substantially as described, the plates $r r'$, the electro-magnet, and the electric connections, combined for joint operation, substantially as shown, said elements combined for joint operations.

13. The combination of the finger-keys, the dogs to lock the respective keys, their actuating-springs, the bar $i$, to release the dogs, the spring $k$, to move said bar, the electro-magnet $q$, to move the bar $i$ against the action of spring $k$, a retarding-dog connecting the bar $i$ with a constantly-moving part of the machine, and electric connections, substantially as described, whereby each key is automatically locked when depressed and automatically unlocked after the lapse of a predetermined period.

14. In a type assembling or composing mechanism, the channel or conductor having the open side and admitting the type through said side at different points in its length, in combination with the retaining device $u$, substantially as described, extending lengthwise of the conductor and adapted to laterally engage the type after their admission into the conductor.

15. In a mechanism for assembling matrices or type, the series of magazine-tubes, the series of finger-keys by which the type are delivered from the respective tubes, an open channel or guide into which the type are delivered, and the longitudinal laterally-movable retaining device, substantially as described, adapted to loosely engage the type and prevent their escape from the channel during their movement therethrough.

16. In a type assembling or composing mechanism, the conductor having the open side admitting the type thereto at various points in its length, in combination with the finger-key mechanism for inserting the type through said open side, and the laterally-movable retaining device extended longitudinally of the conductor and connected with the series of finger-keys, as described, whereby the action of the keys is caused to effect the insertion of the type and also to control the retaining device.

17. In a mechanism for assembling matrices or type, the guide or channel through which the type are delivered to the point of assemblage, open at one side for the admission of the type, in combination with the longitudinal laterally-movable bars $u$.

18. The combination of the type guide or channel open at one side, the obliquely-slotted bars $u$, and the series of finger-keys connected with said bars by means substantially as described.

19. The oscillating type-discharging keys $c$, provided with arms $g$, in combination with the type guide or channel D, the bars $u$, the bar $r$, the vibratory air-nozzle and connections, substantially as described, from the bar $r$ to the nozzle, and the bars $u$, whereby the depression of a key is caused to discharge a type or matrix into the guide, to deflect the air-blast temporarily from the line, and to retract the bars $u$, that the matrix may enter the guide in position to be engaged by said bars when the key rises.

20. In a type composing or assembling mechanism, the guide or channel D and laterally-movable locking-bars $u$ near its base, in combination with a series of type or matrices, M, provided at their upper ends with sustaining-shoulders and adapted at their lower ends to engage the bars $u$, whereby the type are retained in an upright position during their discharge through the guide, so that the air-blast may act effectively upon them.

21. In a machine for assembling matrices or type, a guide or channel open at one side for the introduction of the type and provided with means, substantially as described, for engaging and guiding the type at both ends, in combination with a conductor for delivering a blast longitudinally through said channel, whereby the type are retained in position transversely across the channel while being driven therethrough.

22. In a composing mechanism, the cam $i'$ and arm $h'$, actuated thereby, in combination with the hand-lever $g'$, adapted to engage said arm, the reciprocating bar $f''$, and the pawls $d'$, connected with the bar, whereby the pawls may be automatically reciprocated to assemble the matrices and then advanced a greater distance by hand to transfer the assembled matrices.

23. In a composing mechanism, the combination of the type guide or channel, the blast-delivery tube to effect the advance of the type through the channel, the elastic detent to arrest the advancing type, and the pawls to engage the type and prevent them from rebounding.

24. In a distributing mechanism, the distributer-rail, substantially as described, attached to the frame at one end only, in combination with the traveling carrier-plates adapted to engage and sustain said rail.

25. The distributer-rail attached to a support at one end and provided with the dovetailed rib on its edge, in combination with the traveling plates R, to engage said rib, and the stationary frame A, with ears or guide to support the plates R, as described and shown.

26. In combination with the distributer-rail, the carrier plates R, provided with fixed projecting pins $b^2$.

27. The distributer-rail and the carrier-plates provided with rigid projecting pins, in combination with mechanism, substantially as described, for lifting the type or matrices between the successive pins into engagement with the rail.

28. The rails L, supporting the type or matrices temporarily, in combination with the distributer-rail at a higher level and the intermediate blocks, O, presenting inclined surfaces to guide the matrices over the lower rails to the distributer-rail.

29. In combination with the temporary supporting-rails L and the distributer-rail at a higher level, the lifting-finger P and the blocks O, having inclined upper surfaces.

30. In combination with the rails L and the lifting-finger P, the yielding plates $z^4$.

31. In combination with the distributing-rail, the blocks O, having inclined upper surfaces, the rails L, to support the matrices temporarily, the yielding plates $z'$, and the vertically-reciprocating finger acting between the rails L and plates $z^4$, substantially as described.

32. In combination with the distributer-rail, the matrix-supporting teeth or ribs having a downward inclination toward the distributer, and means, substantially as described, for lifting the matrices into engagement with said inclined teeth, whereby the matrices are delivered to the rail with a descending motion.

33. In combination with a series of magazine-tubes and a mechanism, substantially as described, for carrying the matrices in a pendent position over the same to the respective tubes, a series of flexible cords extending above and between the tubes, electric circuit-closing devices controlled by said cords, and an electric circuit embracing electro-magnetic devices controlling the matrix-carrying mechanism.

34. In a mechanism for distributing type or matrices, a traveling carrier to advance the type, a clutch mechanism through which said carrier receives motion, an electro-magnet controlling said clutch, an electric circuit embracing said magnet, and circuit-controlling devices, substantially as described, arranged to be actuated by the moving matrices or type which may fall from their proper positions, whereby the displacement of a type is caused to automatically stop the carrier.

35. In combination with the magazine-tubes, the frame W, the flexible partitions $g^2$ therein, the threads $h^2$, connected with the conducting-fingers $i^2$, the electric circuit and its magnet $l^2$, the driving-clutch controlled by said magnet, and a mechanism, substantially as described, driven by said clutch and acting to carry the matrices or type transversely above the partitions $g^2$, substantially as described.

36. In a type or matrix distributing mechanism, the combination of a series of upright magazine-tubes, a positively-acting carrier whereby the type are advanced to the appropriate tubes above the mouths of those which precede them, and an intermediate frame provided with yielding partitions $g^2$, to prevent breakage of the parts in the event of the type being displaced during its motion.

37. In combination with a series of magazine-tubes and a transversely-moving carrier thereover, intermediate yielding partitions adapted to conduct the type into the respective tubes.

38. The mechanism for holding and delivering the space-bar, consisting of a receptacle provided with the inclined upper edges and the stop-shoulders $m'$, combined with the arms $o'$, to lift the forward space-bar out of engagement and permit its escape.

39. In combination with the space-bar receptacle having inclined upper edges and detaining-shoulders $m'$, the vibrating finger $q'$, adapted to act on the foremost bar at the lower end.

40. In combination with the space-bar receptacle having inclined surfaces to cause the gravitation of the bars toward its front and the detaining-shoulders $m'$, to arrest their advance, the fingers $o'$ and $q'$, acting, respectively, on the upper and lower ends of the bars.

41. In combination with the receptacle having inclined edges or shoulders to sustain the space-bars, the overlying plate $n'$, the lifting-fingers $o'$, and the finger-key C, connected therewith, whereby the depression of the finger-key is caused to deliver a space-bar.

In testimony whereof I hereunto set my hand, this 6th day of March, 1886, in the presence of two attesting witnesses.

OTTMAR MERGENTHALER.

Witnesses:
H. G. LELAND,
W. SUMTER BLACK.